May 3, 1960     YAO TZU LI     2,934,951

MASS FLOWMETER

Filed Sept. 9, 1952

INVENTOR.
YAO TZU LI

BY Kenway, Jenney
Witter & Hildreth

ATTORNEYS

United States Patent Office 2,934,951
Patented May 3, 1960

2,934,951
MASS FLOWMETER
Yao Tzu Li, Watertown, Mass.
Application September 9, 1952, Serial No. 308,572
7 Claims. (Cl. 73—194)

The present invention relates to measuring apparatus and more particularly to apparatus for measuring the mass rate of flow of a liquid.

Conventional devices for measuring fluid flows have usually measured the velocity of the fluid indirectly, by detecting the pressure associated with the moving liquid. However, such an indirect measurement has certain disadvantages, chiefly, that to obtain the desired figure of quantity per unit time, that is, pounds per second or grams per second, the measurement must be corrected by the density. This, for example, makes the measurement of rate of flow of a fluid whose density varies very difficult, as where solutions of differing densities are being conveyed through a single pipe to a single receptacle. Likewise, corrections must be made for variations in viscosity and pressure or "head" of the fluid. Furthermore, the physical configuration limits the range over which velocities may be measured with precision.

Therefore, it is one object of the present invention to provide a flow-measuring device which reads quantity-per-unit-time directly.

It is another object to provide a mass flow-measuring device which is not affected by pressure temperature, density and viscosity variations associated with the liquid.

It is another object to provide a mass flow-measuring device which may be used to measure flows with a high response speed.

In furtherance of these and other objects as will hereinafter appear, a principal feature of the present invention is the rotation of the fluid in such a way as to generate in it a Coriolis force, the value of which depends only on the mass rate of flow, and is independent of pressure or density.

A second feature is the detection and measurement of this Coriolis force in a simple and effective manner.

These and other features will appear from the accompanying drawings in—

Figure 1:
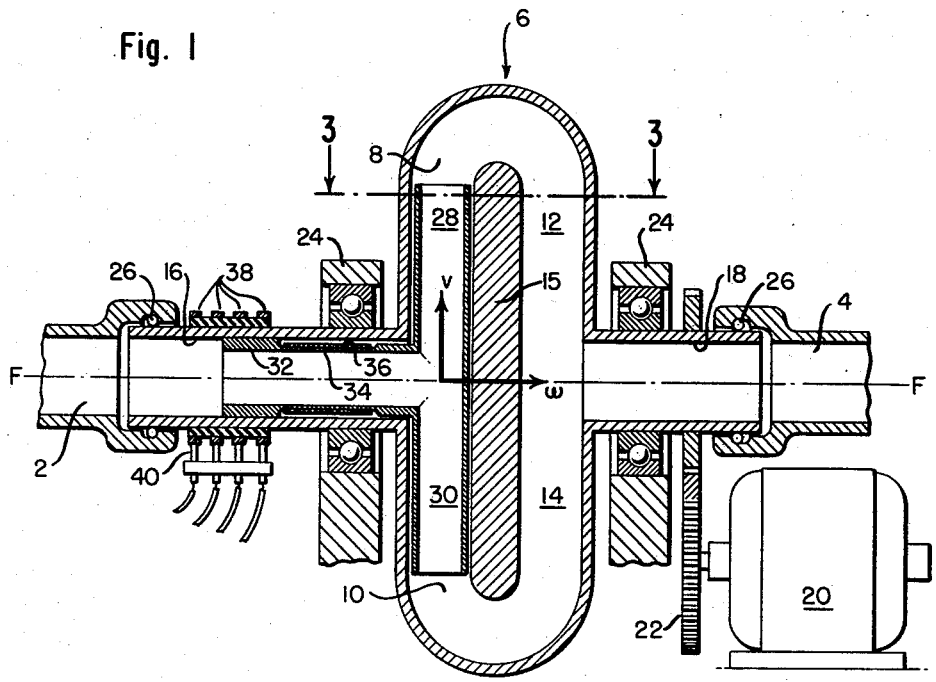
Figure 2:
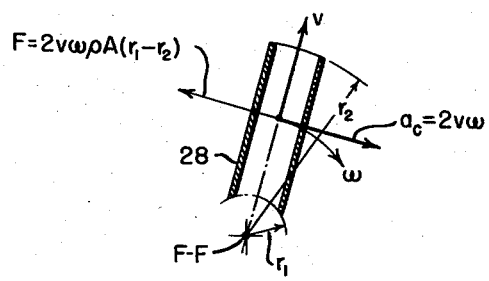
Figure 3:
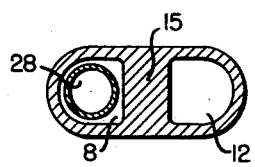

Fig. 1 shows the flow-measuring device; and
Fig. 2 is an illustrative drawing which shows the generation of the Coriolis force; and
Fig. 3 is a sectional view on line 3—3 of Fig. 1.

The present invention operates by causing the fluid to be rotated as it flows radially outward from an axis. This produces a Coriolis acceleration in the fluid, and therefore a Coriolis force is applied by the fluid to the member through which the fluid flows. This force is measured and the mass rate flow of the fluid is obtained.

The preferred apparatus according to the present invention is shown in Fig. 1. The liquid whose flow is to be measured enters by the pipe 2 and leaves by the pipe 4. A rotating member 6 has two outwardly directed tubular portions 8, 10, and two inwardly directed tubular portions 12, 14. The portions 8, 12 and 10, 14 are separated by a baffle 15. The member 6 has a lead-in tube 16 communicating with the pipe 2 and an exit tube 18 communicating with the pipe 4. The member 6 is rotated about the axis of flow F—F by a motor 20 connected through suitable gearing 22 with the tube 18. Suitable bearings 24 and fluid seals 26 are provided.

Mounted within the tubular members 8 and 10 are two radial tubes 28 and 30 capable of limited movement with respect to the tubes 8 and 10 about the axis F—F. The rotation of these radial tubes produces a Coriolis acceleration in the fluid.

In order to detect and measure the force associated with this Coriolis acceleration, a detector tube 32 is connected with the radial tubes 28 and 30 to form an integral T-shaped structure. The tube 32 lines within the tube 16 and is secured thereto at its left end. The detector has a reduced portion 34 which is less rigid than the remainder and will therefore be subjected to torsional strain under the stress of the Coriolis force.

The preferred manner of measuring the strain in the portion 34 of the tube 32 is by means of a strain gage system 36 mounted in a manner to be sensitive to the twist thereof. The gage is connected to suitable slip rings 38, from which the brushes 40 lead to a suitable bridge or meter to indicate the changes in resistance of the gage 36.

Fig. 2 is an illustrative view looking along the axis F—F at a cross-section of the rotating tube 28. The fluid is being carried by the tube 28 on a path radially extending outward from the axis of rotation F—F, about which the tubes rotate with an angular velocity $\omega$. This angular velocity $\omega$ is represented vectorially along the axis F—F in Fig. 1. The radial velocity $v$ of the fluid is represented vectorially in Fig. 2. It can be shown that every particle of fluid in the tube 28 experiences a Coriolis acceleration $a_c$ which is in a direction perpendicular to both vectors $v$ and $\omega$ and which has a magnitude $$a_c = 2v\omega$$

The Coriolis force acting on any length of the pipe 28 is found by integrating between two radii along the tube $$F = \int_{r_1}^{r_2} 2v\omega\rho A\, dr$$

$$= 2v\omega\rho A (r_2 - r_1)$$

where $\rho$ is the density of the fluid and $A$ is the cross-sectional area. The quantity $vA\rho$ is the mass rate of flow. If the quantity $(r_1 - r_2)$ is taken as the length of the tube 28, which is constant, the force F is that which acts on the tube, which force is therefore proportional to the true mass rate of flow. The flow meter, once calibrated, need not be calibrated for different fluids, since the reading takes full account of the density of the measured fluid.

The rotating member 6 might comprise only the tubular portions 8 and 12, without the opposite portions 10 and 14, and only the single Coriolis tube 28 might be used, the tube 30 being omitted. However, the symmetrical structure is desirable for reasons of balance, especially at high speeds. Furthermore, the use of two Coriolis tubes 28 and 30 doubles the measured force and increases the sensitivity.

The measuring device may be adjusted over a wide range of velocities by varying the rotational velocity $\omega$. For a light fluid, such as a gas, travelling slowly, the measuring pipes may be rotated rapidly to get a full-scale reading. Similarly, for a heavy fluid travelling fast, the rotation is made relatively slow so as to attenuate the detector tube deflection.

The operation of the device is therefore as follows. The fluid to be measured is simply passed into the pipe 2 and out through the pipe 4. When the measurement is to be taken the motor 20 is activated to rotate the measuring member 6. This rotation generates a Coriolis force, deflecting the tubes 28 and 30. When the unit has reached its constant speed ω, the mass-flow may be read directly from a dial indicating the resistance of the strain gage system 36.

It will be understood that the present invention, in its more general aspects, contemplates the measurement of mass flow by the generation of a Coriolis force through the combined rotation and radial flow of a fluid. The Coriolis force may then be measured in any suitable manner, the measurement being preferably, though not necessarily, carried out as shown herein, by a strain gage system.

Having thus described the invention, I claim:

1. A fluid flow measuring arrangement comprising a first member rotatable about an axis and having a fluid passage therethrough extending outwardly from said axis, a second member rotatable about said axis having a fluid passage therethrough communicating with said passage of said first member and extending inwardly toward said axis, yieldable means connecting said members and restraining relative angular movements of said members about said axis, means rotating said members about said axis at a substantially constant speed, and measuring means responsive to angular displacements of one of said members with respect to the other about said axis.

2. A mass-rate of flow meter comprising a hollow member having coaxial communicating inlet and outlet tubular extensions therefrom, at least a portion of said hollow member extending outwardly from the axis of said extensions, means mounting at least one of said extensions for rotation of said member, constant speed power means drivingly connected to said member, a tubular detector member including a hollow shank disposed coaxially within one of said extensions with its outer end rigid with said one extension, said detector including a portion extending outwardly freely within the outwardly extending portion of said hollow member whereby upon rotation of said members while fluid is passing therethrough said detector member will tend to deflect relative to said hollow member, and means for continuously sensing said deflection and indicating the same in terms of fluid flow.

3. A fluid measuring arrangement comprising a hollow member rotatable about an axis and having a fluid passage extending outwardly from and inwardly back toward the axis, inlet and outlet connections for lead'ng fluid into and out of said passage, drive means for rotating the hollow member about the axis, a detector member in said passage and yieldingly connected to the hollow member, said detector member being subject to angular deflection relative to the hollow member in response to the Coriolis force exerted between the fluid and the detector member, and measuring means responsive to deflections of the detector member.

4. A fluid measuring arrangement comprising a hollow member rotatable about an axis and having a fluid passage with axially aligned portions and non-axial portions extending outwardly from and inwardly back toward the axis, inlet and outlet connections for leading fluid into and out of said passage, drive means for rotating the hollow member about the axis, detector means within a non-axial portion of the hollow member, a yielding mounting for the detector means on the hollow member to permit deflection of the detector means with respect to the hollow member on passage of fluid therethrough, and measuring means responsive to deflection of the detector means.

5. A fluid measuring arrangement comprising a hollow member rotatable about an axis and having a fluid passage with axially aligned portions and non-axial portions extending outwardly from and inwardly back toward the axis, inlet and outlet connections for leading fluid into and out of said passage, drive means for rotating the hollow member about the axis, a detector tube within a non-axial portion the hollow member, a yielding mounting for the detector tube on the hollow member to permit deflection of the detector tube with respect to the hollow member in a direction normal to both the axis of rotation and the axis of fluid flow through the passage, and measuring means responsive to deflection of the detector tube.

6. A fluid flow measuring device comprising coaxially disposed inlet and outlet pipes, a first member extending radially outward from said inlet pipe and having a first fluid passage formed therethrough in communication with said inlet pipe, a second member extending radially outward from said outlet pipe and having a second fluid passage formed therethrough, said second fluid passage being in communication with said first fluid passage and with said outlet pipe, said first and second fluid passages extending in radial directions relative to said pipes, yieldable means connecting said first member to said second member, means for rotating said first and second members about the axis of said inlet and outlet pipes, and means for indicating the angular displacement of one of said members relative to the other in response to the flow of fluid therethough.

7. A measuring device for fluid flowing in a pipe having coaxial inlet and outlet sections comprising means connected to said inlet section of said pipe to form a fluid passage extending outwardly from the axis of the pipe for accelerating said fluid in directions radial to the axis of said pipe, means connected to the outlet section of said pipe to form a fluid passage for guiding said fluid radially back to the outlet section of said pipe, means for rotating said first and second mentioned means about the axis of said inlet and outlet pipe sections means yieldably connecting said first-mentioned and said second-mentioned means to cause an angular displacement between said first and second mentioned means in response to fluid flow therethrough, and means for measuring the angular displacement of said first mentioned means relative to said second mentioned means.

References Cited in the file of this patent

UNITED STATES PATENTS

| | | |
|---|---|---|
| 1,215,135 | Fisher | Feb. 6, 1917 |
| 2,602,330 | Kollsman | July 8, 1952 |
| 2,624,198 | Pearson | Jan. 6, 1953 |